(12) United States Patent
Samayamantry

(10) Patent No.: US 8,762,541 B2
(45) Date of Patent: Jun. 24, 2014

(54) SYSTEMS AND METHODS FOR ROUTING A COMMUNICATIONS LINK

(75) Inventor: Mallikarjuna Samayamantry, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 2095 days.

(21) Appl. No.: 11/065,852

(22) Filed: Feb. 25, 2005

(65) Prior Publication Data
US 2006/0195585 A1    Aug. 31, 2006

(51) Int. Cl.
*G06F 15/16* (2006.01)

(52) U.S. Cl.
USPC .......... 709/227; 709/201; 709/202; 709/203; 709/204; 709/217; 709/218; 709/223; 709/224; 709/225; 709/226; 709/228; 709/229; 709/238; 709/239; 709/240; 709/241; 709/242; 709/253; 726/3; 726/4; 726/5; 726/6; 726/11; 726/14; 726/17; 726/18; 726/19; 726/21; 726/22; 726/23; 726/24; 726/25

(58) Field of Classification Search
CPC ......... H04L 12/00; H04L 12/16; H04L 12/18; H04L 12/1813; H04L 12/24; H04L 12/26; H04L 51/00; H04L 51/12; H04L 51/14; H04L 63/08; H04L 63/083; H04L 63/0853; H04L 63/0861; H04L 63/0869; H04L 63/0876; H04L 63/0272; H04W 12/00; H04W 12/02
USPC ......... 709/227, 201, 202, 203, 204, 217, 218, 709/223, 224, 225, 226, 228, 229, 238, 239, 709/240, 241, 242, 253; 379/114–115; 370/352–356; 726/3, 4, 5, 6, 11, 12, 726/13, 14, 17, 18, 19, 21, 22, 23, 24, 25
IPC .................. H04L 12/00,12/16, 12/18, 12/1813, H04L 12/24, 12/26, 51/00, 51/12, 51/14, H04L 63/08, 63/083, 63/0853, 63/0861, 63/0869, H04L 63/0876, 63/0272; H04W 12/00, 12/02, H04W 12/04, 12/06, 12/08, 40/00, 40/02, H04W 40/04, 40/12, 48/00, 48/02, 48/08, H04W 48/16, 48/17, 48/18, 48/20, 60/00, H04W 60/06, 60/005
See application file for complete search history.

(56) References Cited

U.S. PATENT DOCUMENTS 5,657,372 A * 8/1997 Ahlberg et al. ............. 455/414.1
5,815,561 A * 9/1998 Nguyen et al. ........... 379/115.01
(Continued)

FOREIGN PATENT DOCUMENTS

EP          0604042 A1    6/1994

OTHER PUBLICATIONS

Siemens: "Real Time Communication Meets Real Time Information" Openscape V1.0;New Intelligence in Communications, Jun. 2003, XP002322312.

(Continued)

*Primary Examiner* — Saket K Daftuar
(74) *Attorney, Agent, or Firm* — Buchanan Ingersoll & Rooney PC

(57) ABSTRACT

Devices, systems and methods that route a communication link to a proper destination are disclosed. The method may include connecting the communication link to a first destination; requesting a response from the first destination; validating the response from the first destination; and disconnecting the communication link to the first destination if the response from the first destination is not valid. The method may also include connecting the communication link to a second destination; requesting a response from the second destination; and disconnecting the communication link to the second destination if the response from the second destination is not valid. The devices, systems and methods may provide hunt group, call center and conference call features as discussed later herein.

10 Claims, 5 Drawing Sheets

(56) References Cited

U.S. PATENT DOCUMENTS

| | | | |
|---|---|---|---|
| 5,826,195 A * | 10/1998 | Westerlage et al. | 455/456.3 |
| 6,078,583 A * | 6/2000 | Takahara et al. | 370/356 |
| 6,252,952 B1 * | 6/2001 | Kung et al. | 379/114.1 |
| 6,275,934 B1 * | 8/2001 | Novicov et al. | 713/168 |
| 6,570,855 B1 * | 5/2003 | Kung et al. | 370/237 |
| 6,643,362 B2 * | 11/2003 | Hogan et al. | 379/196 |
| 6,775,267 B1 * | 8/2004 | Kung et al. | 370/352 |
| 6,816,469 B1 * | 11/2004 | Kung et al. | 370/260 |
| 6,895,558 B1 * | 5/2005 | Loveland | 715/746 |
| 6,973,309 B1 * | 12/2005 | Rygula et al. | 455/436 |
| 7,046,680 B1 * | 5/2006 | McDysan et al. | 370/396 |
| 7,154,999 B2 * | 12/2006 | Florkey et al. | 379/142.01 |
| 7,337,214 B2 * | 2/2008 | Douglass et al. | 709/214 |
| 7,403,766 B2 | 7/2008 | Hodge | |
| 2002/0078153 A1 * | 6/2002 | Chung et al. | 709/204 |
| 2002/0085702 A1 * | 7/2002 | Cox et al. | 379/218.01 |
| 2002/0196781 A1 * | 12/2002 | Salovuori | 370/352 |
| 2003/0095510 A1 * | 5/2003 | Dorenbsoch | 370/260 |
| 2003/0185359 A1 * | 10/2003 | Moore et al. | 379/114.01 |
| 2004/0003046 A1 * | 1/2004 | Grabelsky et al. | 709/206 |
| 2004/0122910 A1 * | 6/2004 | Douglass et al. | 709/214 |
| 2006/0106933 A1 * | 5/2006 | Huang et al. | 709/227 |

OTHER PUBLICATIONS

Johnston MCI 0 Levin Microsoft Corporation A: Session Initiation Protocol Call Control—Conferencing for User Agents; draft—ietf—sipping—cc—conferencing—06 .txt; IETF Standard—Working—Draft, Internet Engineering Task Force, IETF, CH, vol. sipping, No. 6, Nov. 29, 2004, XP015027850 ISSN: 0000-0004.

* cited by examiner

SYSTEMS AND METHODS FOR ROUTING A COMMUNICATIONS LINK

BACKGROUND OF THE INVENTION

The present invention relates generally to communication systems, and more particularly to telecommunication systems that route communications to a proper location.

Business tasks often involve live meetings between two or more individuals. Often referred to as presence-based communications, individuals need to be able to receive and respond to information in a real time manner. This requires individuals to be simultaneously accessible and able to connect to one another via a communications link.

The communications link can be in the form of written communications, such as email or chat-forums. The communications link can also be in verbal form via, for example, a telephone network. The communications-link can also be accomplished using a video conference or a combination of document retrieval and email or telephone.

A variety of devices may be used to allow individuals to communicate with one another, for example, telephones, pagers, email, chat forums, and video conferencing devices. These devices can work on a variety of platforms and transmit information using a variety of protocols. A telephone, for example, can send voice information with a traditional circuit-based protocol on a Public Switched Telephone Network (PSTN) or it can send voice information in discrete digital packets using an internet protocol termed "Voice over IP" (VoIP).

To facilitate and manage communications, businesses often use various platforms to network the various protocols and devices used to communicate. A business, for example, may use a server with various communications applications to route, store, and manage the communications received and sent by the business. Similarly, these communication applications can also be stored and installed on individual communication devices. For example, a telephone may have an answering machine to answer calls when the user is unavailable. In addition to routing and storing communications, the system may be able to translate the communications into different forms. For example, a system can translate an email or other written communication into a verbal message. This allows individuals to communicate with others using the various forms of communication.

Businesses often require individuals to attend meetings on a regular basis. In addition to the difficulties associated with finding a convenient time that meets the availability of all attendees, each attendee must also be located and connected via a communication device. Businesses often require individuals to travel to remote destinations or be on-call after normal business hours. To facilitate individuals' lifestyles and family needs, many businesses allow employees to work from home or other remote locations. The system needs to be able to identify the current location of an individual from a variety of possible locations. In addition to an increasing variety of work locations, individuals also have a variety of devices that they use to communicate. The system may also need to be able to work with a variety of different communications protocols and devices.

Accordingly, an efficient and effective method is needed for a system to provide a communication link to an individual. In view of the foregoing, it is desirable to provide a system that can determine the availability of an individual at a variety of locations and on a variety of devices. It is also desirable to ensure that the system contacts the correct individual and establishes a communication link with the correct individual.

SUMMARY OF THE INVENTION

It is, therefore, an objective of the present invention to provide devices, systems, and methods that route a communication link to a variety of locations and devices. It is also desirable to ensure that the system routes the communication link to the correct individual and not a passive answering device.

According to an exemplary embodiment of the invention, a method may include connecting the communication link to a first destination; requesting a response from the first destination; and validating the response from the first destination. The invention may disconnect the communication link to the first destination if the response from the first destination is not valid. In another aspect of the invention, the method may also include connecting the communication link to a second destination; requesting a response from the second destination; and disconnecting the communication link to the second destination if the response from the second destination is not valid.

In another exemplary embodiment, the method may be used to provide one or more communication links to members of a telephone conference call. The method may also notify other conference members of the unavailability of a conference member at the first destination if the response from the first destination is not valid. In yet another exemplary embodiment, the response may be validated using a voice recognition protocol. The response may also be a touch-tone signal that is validated by the system. In yet another aspect of the invention, requesting a response may further comprise transmitting an audio segment requesting a response from an active member.

The invention may also include a system or device that may include a module for connecting the telephone call to a first phone number; a module for requesting a response from the location of the first phone number; a module for validating the response from the location of the first phone number; and a module for disconnecting the telephone call to the first phone number if the response from the first phone number is not valid. The device may also include a module for connecting the communication link to a second destination; a module for requesting a response from the second destination; and a module for disconnecting the communication link to the second destination if the response from the second destination is not valid.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
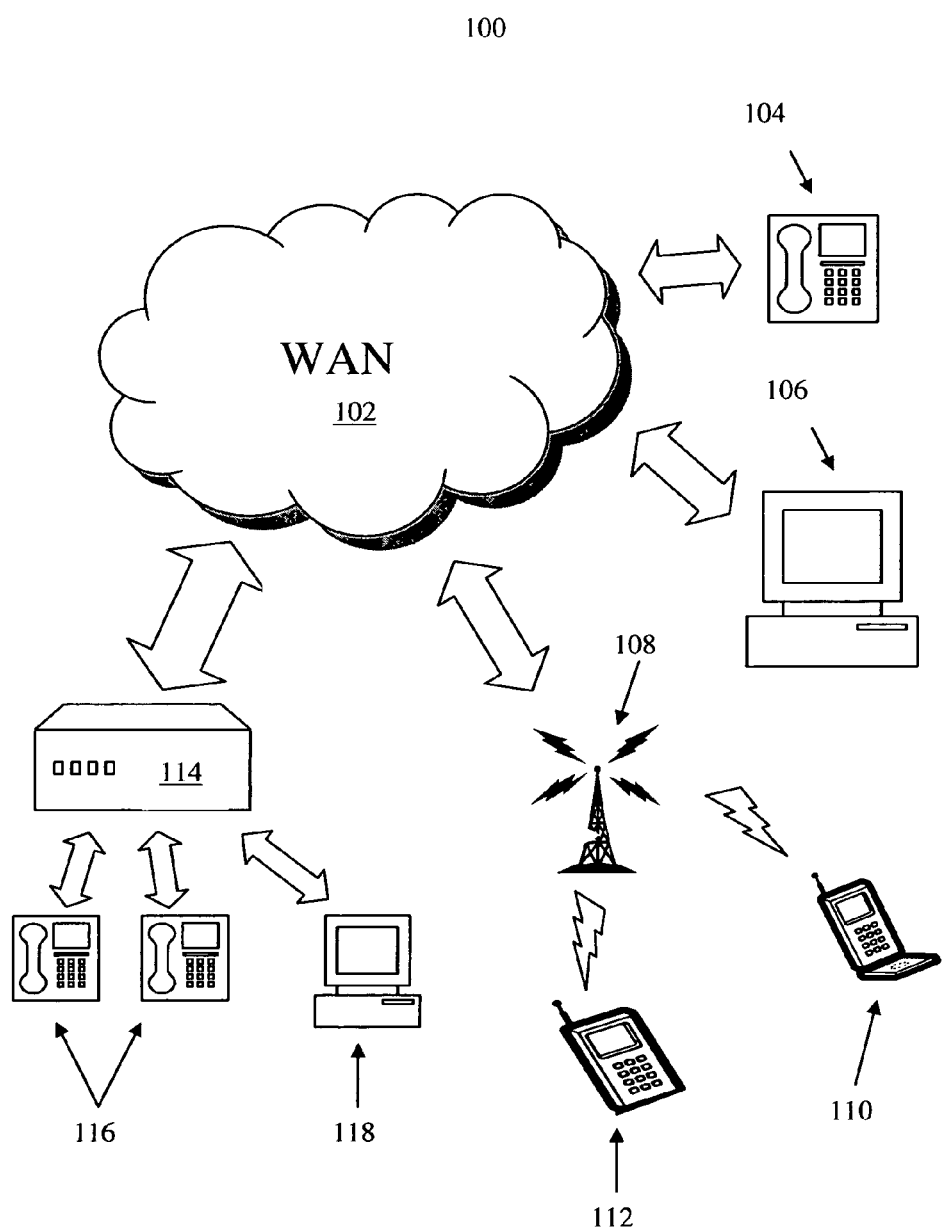
FIG. 1 shows a generalized schematic of an exemplary communications network used to implement the present invention.

FIG. 1 is a generalized schematic of an exemplary communications network 100 used to implement the present invention. The communications network 100 connects various communication devices through a Wide Area Network (WAN) 102. The WAN 102 can use a variety of protocols and platforms to transmit information. A telephone 104 can send voice information with a traditional circuit-based protocol on a Public Switched Telephone Network (PSTN). A computer 106 can transmit information in discrete digital packets using an internet protocol. Various substations and networks can reformat and transmit the information using multiple protocols prior to delivering the information to the final destination. The WAN 102 can also include a wireless network of communication devices. An antenna 108 can send and receive signals from a cell phone 110 and/or a Personal Data Assistant (PDA) 112. A server 114 can be used to manage communications of a local area network (LAN). The LAN can network multiple employee telephones 116 as well as employee computers 118. The server 114 manages the communications received and transmitted from the LAN.

The server 114 can be programmed to direct and manage phone calls to employee telephones 116 and employee computers 118 in the LAN. The server 114 can function as a work group management system. For example, the server 114 can direct a phone call to a message box if a user has directed the system based on some predetermined parameters. The user can set up the system to redirect a phone call to another number if the user does not answer the phone at the current phone number.

In addition to directing received calls, the system can also direct outbound calls. A user can direct the system to respond to a dialed number by first calling a first number associated with a first destination and then forwarding the call to a second number if the correct recipient does not answer at the first number. The system can also be programmed to call a list of numbers associated with a list of telephone conference members. If the system fails to reach the intended conference member, the system can attempt to contact the individual at other locations or notify other members of the conference that the intended member is unavailable.

Figure 2:
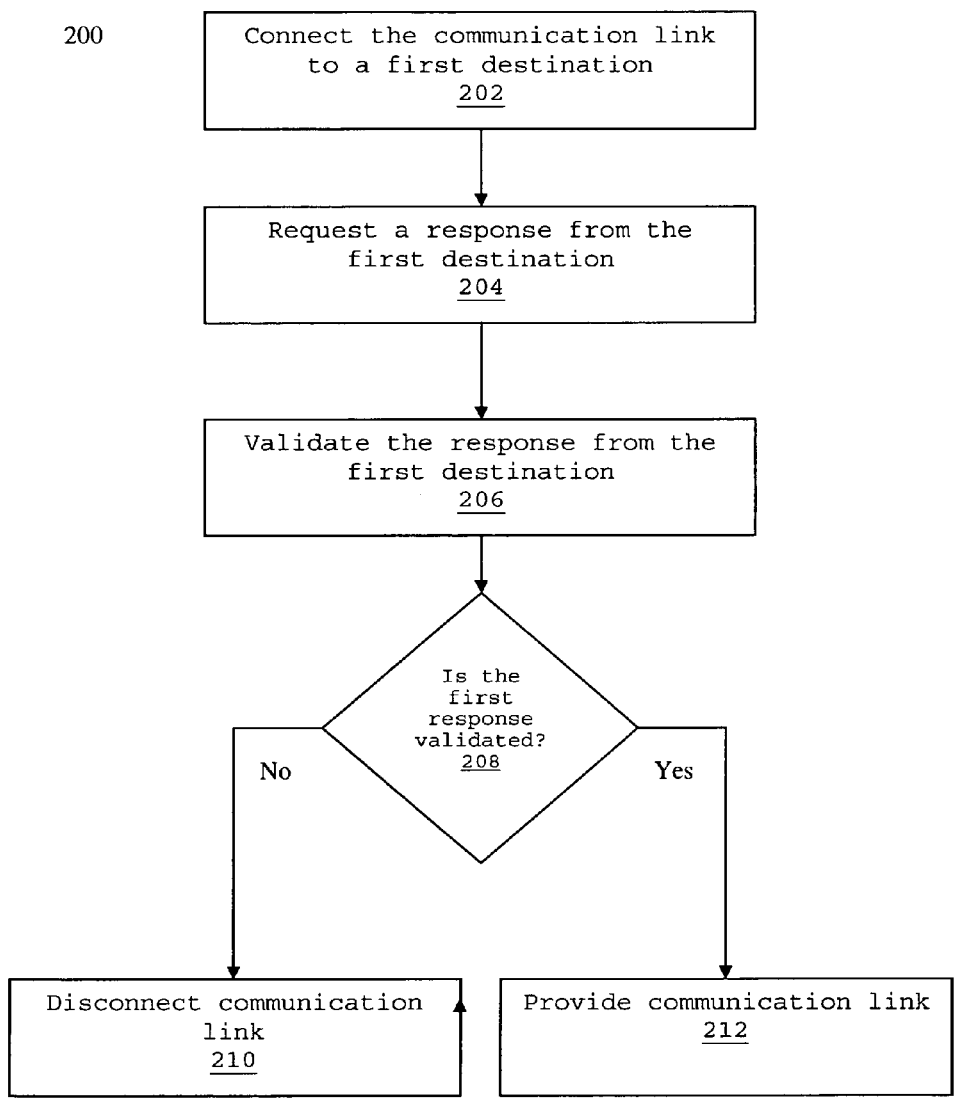
FIG. 2 is a flow chart illustrating a first exemplary embodiment of the present invention.

FIG. 2 is a flow chart illustrating a first exemplary embodiment 200 of the present invention. According to the first exemplary embodiment 200, when the system receives or transmits a call, the system connects the communication link to a first destination (block 202). The first destination may be a phone number associated with the intended recipient's primary location. Once the communication link is established, the system requests a response from the first destination (block 204). This can be in the form of an audio prompt. For example, the system can transmit an audio segment such as, "Please identify yourself" or "Enter your employee number." The system waits for a response from the first destination. The system then validates the response from the first destination (block 206). If the response is an audio response, the system can use a variety of techniques to validate the response from the first destination.

The system can use voice identification to identify the individual answering the phone. The system can use a variety of techniques known to individuals skilled in the art of voice identification. The system can compare the audio response with a computer simulated response based on the suggested or predefined pronunciation of the user's name. The system can also compare the audio response with a prerecorded version of the user's name in the user's voice. The system can then compare the voice of the prerecorded user's name with the user's transmitted response. This allows the system to perform voice analysis on the response and provide a higher level of authentication of the intended recipient.

In addition to voice identification techniques, the system can also have the recipient provide a touch-tone response. For example, the system can prompt the individual to enter a secure code via the touchpad on the telephone used by the recipient. The system can request that the recipient enter a secure four-digit member code for a corresponding meeting. The member, having received the member code in a prior communication, would enter the four-digit code via the keypad on the member's telephone. The system would receive the code and authenticate the transmitted code. Once the code is authenticated, the system can provide the member access to the conference. If the recipient fails to enter the proper member code (block 208), the system may disconnect the recipient (block 210) or request that the recipient re-enter the member code. If the recipient enters the proper member code (block 208), the system continues to provide the communication link (block 212). The member code allows the system to determine whether or not the recipient is the correct member. If the recipient fails to enter a member code or enters an incorrect code, the system can disconnect the communication link and perform additional aspects disclosed in a second exemplary embodiment 300 of the invention.

The response provided by the recipient not only allows the system to determine if the correct recipient has been contacted but also allows the system to determine if it has not connected to a live individual. For example, the recipient may not pick up the telephone and the system may connect to the recipient's answering machine. The system can recognize by the failure to respond or inadequacies of the response that the recipient has not been contacted and the system has connected to an answering machine.

The system allows individuals to connect to a variety of devices without the hassles of programming each device to work with the system. For example, the individual need not set all telephones that the system may use to contact the individual to connect to an answering machine after a specific number of rings. This also allows the recipient to use a variety of communication devices without the concern of compatibility with the system.

The system can recognize a variety of types of answering machines. The system can be programmed to recognize that if no response is provided within five seconds, for example, the system may disconnect the communication link or request a response again and wait another five seconds. If an answering machine were to answer the telephone, the system can use a predefined correct response of "John Doe speaking" and recognize that the response provided, "Hello, you have reached John Doe. I am currently not available to take your phone call . . . " is incorrect and not the intended recipient.

Figure 3:
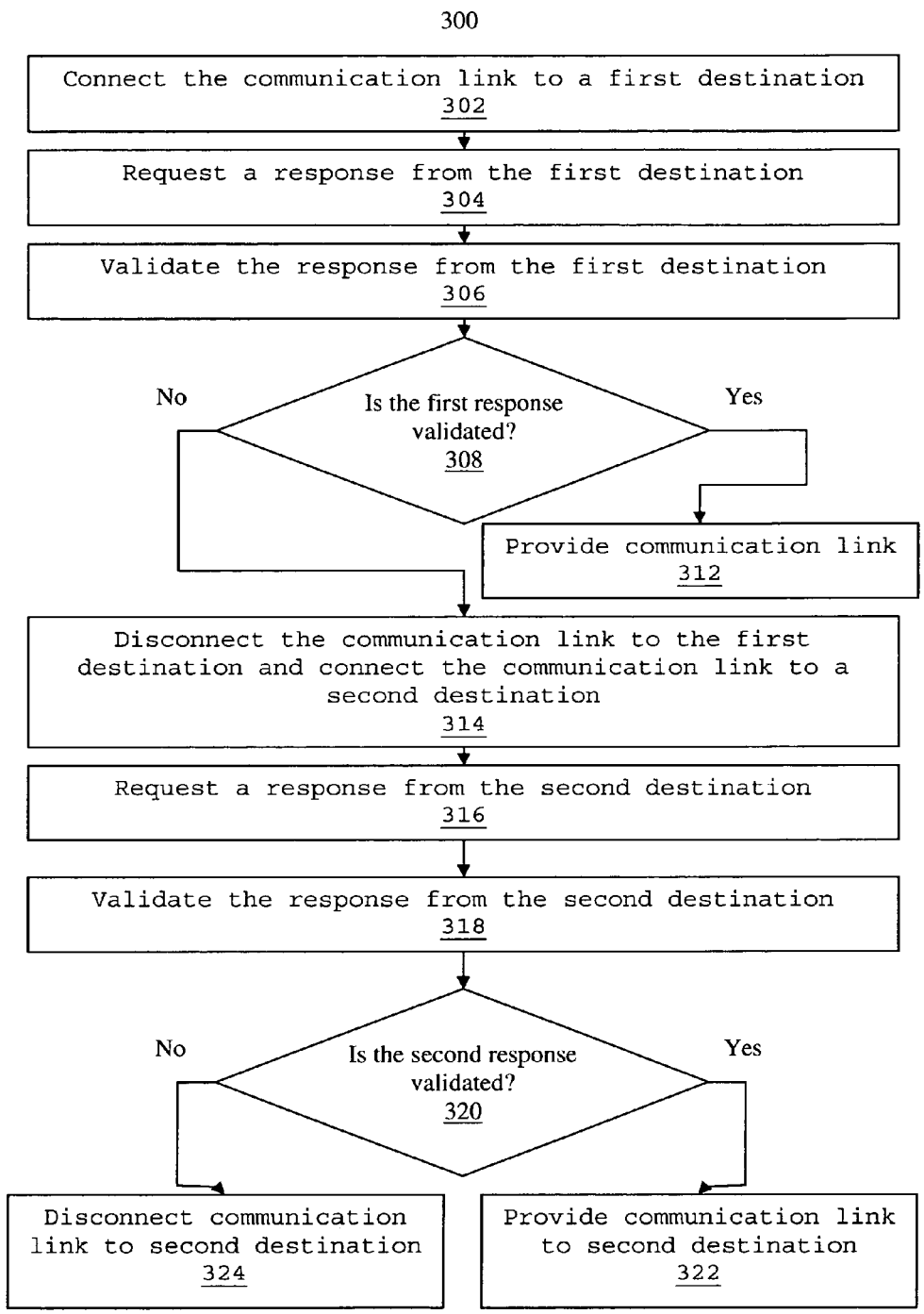
FIG. 3 is a flow chart illustrating a second exemplary embodiment of the present invention.

FIG. 3 is a flow chart illustrating a second exemplary embodiment 300 of the present invention. According to the second exemplary embodiment 300, when the system receives or transmits a call, the system connects the communication link to a first destination (block 302). Similar to the first exemplary embodiment 200, the system requests a response from the first destination (block 304). Once the system receives the response from the first destination, the system validates the response from the first destination (block 306). As previously discussed, the system can request a variety of responses from the recipient as well as a variety of validation techniques to verify that the recipient is the correct member. If the first response is valid (block 308), the system continues to provide the communication link (block 312). If the first response is invalid (block 308), the system can disconnect the communication link to the first destination and provide a communication link to a second destination (block 314).

The second destination can be a secondary number of the recipient. For example, the secondary number can be the recipient's cell phone or home-office phone. The system requests a response from the second destination (block 316). As discussed in the first embodiment 200, the response can be an audio response or a code entered via the touchpad of the recipient's phone. Once the system receives the response, the system validates the response received from the recipient (block 318). The system can use a variety of techniques to validate the response as previously discussed in the first exemplary embodiment 200. If the response is valid (block 320), the system continues to provide the communication link to the second destination (block 322). If the response is not received or is invalid (block 320), the system may disconnect the communication link to the second destination (block 324).

The system is not limited to providing communication links to only two destinations as shown in FIG. 3. As will be apparent, the system can provide communication links to multiple locations. The system can use the exemplary method illustrated in FIG. 3 to provide communication links to three or more locations. For example, the first destination can be the employee's office phone, the second destination can be the employee's home-office phone, and the third destination can be the employee's cell phone.

In addition to using the system described in the first and second exemplary embodiments 200, 300 to route and connect telephone calls, the system can also be used to provide communication links for emails, chat forums, and video conferences as well as many other methods of communication. The system can also be used to provide communication links for a combination of communication devices. For example, the first location may be a work telephone number and the second location may be a work email address. The email may alert the individual of the phone call and allow the individual to enter an additional number for the system to connect to the individual. The system can also allow the individual to respond to the email and establish a communication link with the phone call and the email address using a translator of the system.

In addition to responding to preformatted rules directing the system to contact a second location when the recipient is not at a first location, the system may be programmed to use a variety of additional rules. For example, the system can be directed to connect the communication link to a work phone number between the hours of 8:30 AM and 5:30 PM and to connect the communication link to a home office number otherwise. In another example, the system can connect the communication link to a first employee and require a first response from the employee. If the employee is unavailable or does not provide the correct response, the system may connect the communication link to a second location and request a second response different from the first response. For example, the first response may require the recipient to say, "This is the shipping department" while the second response may require the recipient to say, "This is the Supervisor".

The system may perform the above method without alerting the caller that the system is authenticating the recipient or attempting to contact the recipient at multiple destinations. For example, the system may receive a communication link from a customer. The system may prompt the customer to please hold while the system contacts the intended recipient. The system can attempt to contact the recipient at multiple locations, for example, an office, cell or home phone. Once the recipient is contacted and identified, the system can connect the communication link without the customer knowing that multiple locations were attempted and without accidentally connecting the customer to an answering machine. In another example, the system can provide the caller with choices. The system may prompt the caller with a message stating that the intended recipient is not available at the first destination and ask the caller if the caller would like to try another destination. Based on the caller's choice, the system may connect the caller to a second destination.

Figure 4:
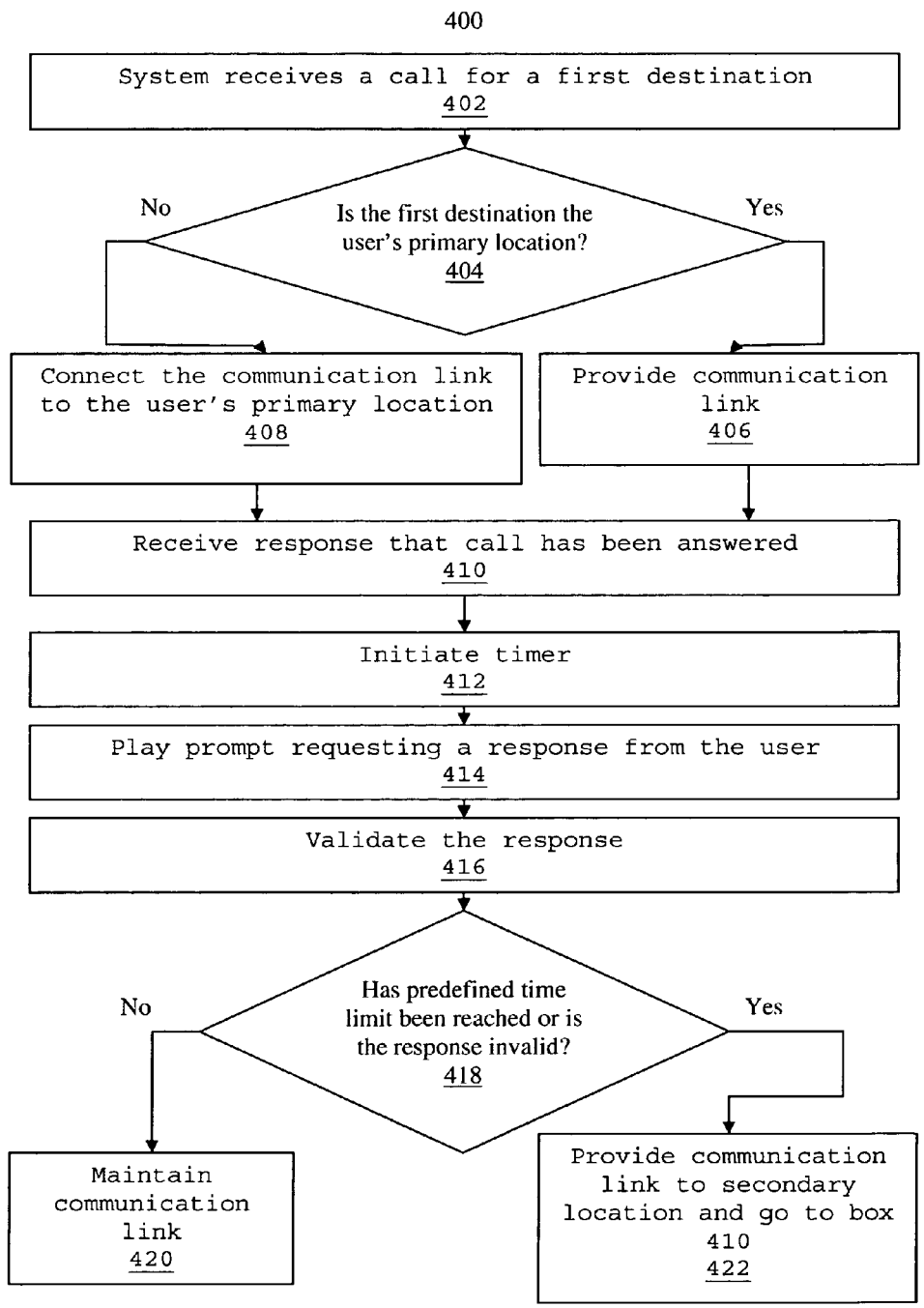
FIG. 4 is a flow chart illustrating an example of a telecommunication system implementing methods of the present invention.

FIG. 4 is a flow chart illustrating an example of a telecommunication system implementing methods of the present invention 400. The example illustrated in FIG. 4 can be, for example, a call received by a call center or a work group management system. The system receives a call for a first destination (block 402). The system may then check to see if the first destination is the user's primary location (block 404). The user may provide predefined rules for the system as previously discussed. If the first destination is the user's primary location (block 404), the system will connect the communication link to the first destination (block 406). If the first destination is not the user's primary location (block 404), the system may reroute the communication link to the user's primary location (block 408). The user's primary location may be, for example, the user's office phone. The system would direct all calls for the user to the user's office phone. The system then may receive a response that the office phone or primary location has answered the communication link (block 410). Once the call is answered, the system may initiate a timer (block 412). The system may also play an audio prompt requesting a response from the user (block 414). After a predetermined amount of time, the system will validate any response received by the system (block 416).

If the timer has not reached a predetermined time and the response is validated by the system (block 418), the system maintains the connection (block 420). The system may also prompt the original caller and direct the two parties to communicate directly. If the timer reaches a predetermined time without a response or the response is invalidated by the system (block 418), the system may then disconnect the communication link to the user's primary location and provide a communication link to a secondary location (block 422), for example, the user's cell phone. If none of the predefined destinations provide a correct response the communication link can be routed to a specific answering machine. This allows the user to use one specific answering machine for messages instead of being concerned with multiple answering machines.

Figure 5:
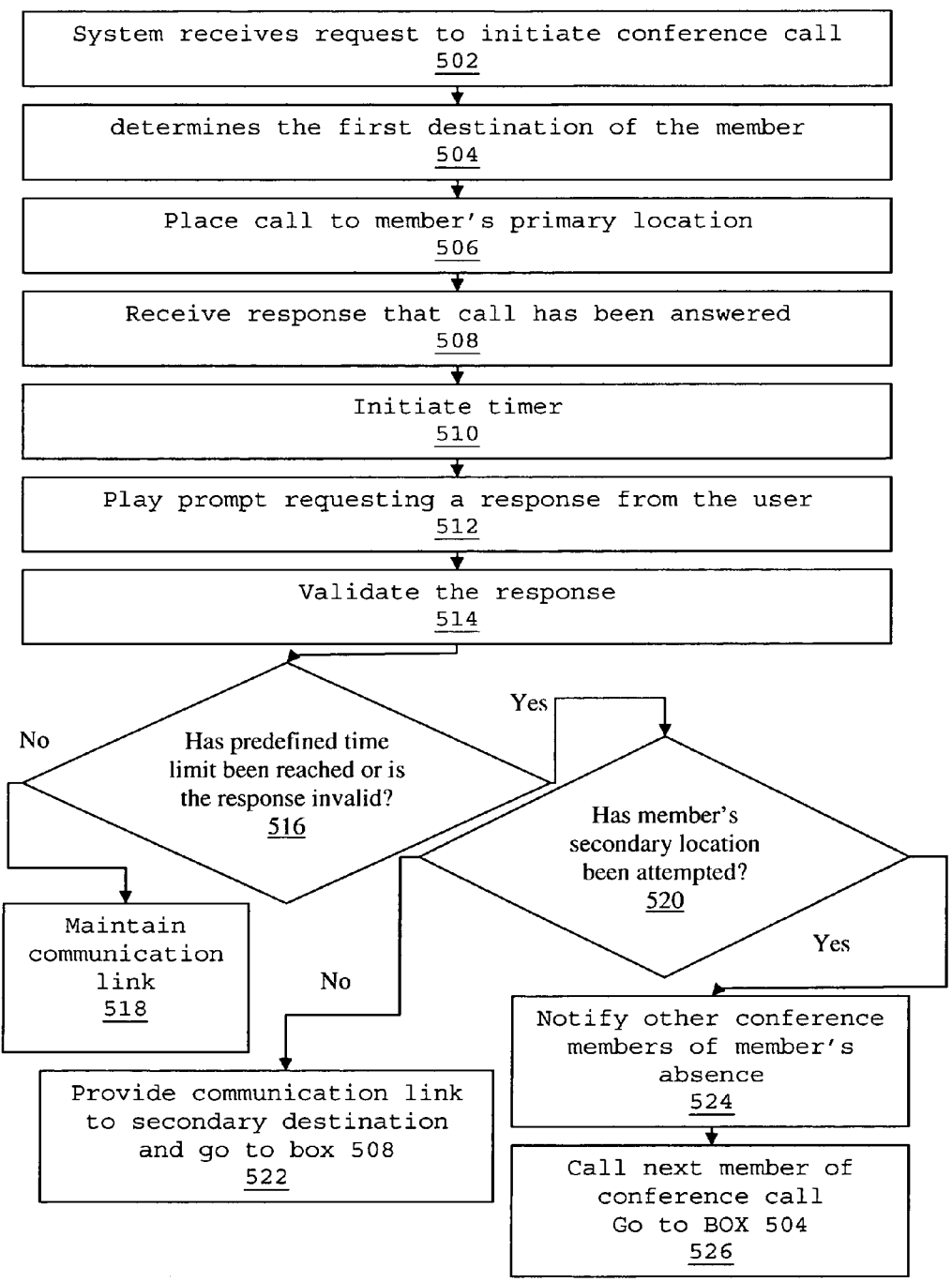
FIG. 5 is a flow chart illustrating another example of a telecommunication system implementing methods of the present invention.

FIG. 5 is a flow chart illustrating another example of a telecommunication system 500 implementing methods of the present invention. The example illustrated in FIG. 5 can be, for example, a system for initiating a conference call or other phone roster. The system receives a request to initiate the conference call or call roster (block 502). The system determines the first location of the first member of the conference call (block 504). The system places a call to the first location of the first member (block 506). The system receives a response that the call has been answered (block 508). Once the call is answered, the system may initiate a timer (block 510). The system may also play an audio prompt requesting a response from the user (block 512). After a predetermined amount of time, the system will validate any response received by the system (block 514).

If the timer has not reached a predetermined time and the response is validated by the system (block 516), the system maintains the connection (block 518). The system may also prompt the conference call members that the member is now an active participant and proceed to contact the next member of the conference call. If the timer reaches a predetermined time without a response or the response is invalidated by the system (block 516) and the member's secondary location has not been attempted (block 520), the system may then disconnect the communication link to the user's first location and attempt a communication link to a second destination (block 522). If none of the predefined destinations provide a correct response and the member's secondary location has been attempted (block 520), the communication link may notify other members of the conference that the member is unavailable (block 524). The system may then proceed to contact the next member of the conference call or phone roster (block 526).

Architecturally, aspects of the invention can be located on a server, workstation, minicomputer, or mainframe. Aspects of the invention can also be located on a stand-alone device, for example a telephone, cell phone, desktop computer, or Personal Data Assistant (PDA). The methods and system can also be used with a server or computer network that provides, for example, a work group management system, a conference organizer, a telephone notification system, a call center, a hunt group, or other networking software. The hunt group may be a rudimentary call center type application run on a variety of devices.

Generally, the general purpose computer, in terms of hardware architecture, includes a processor, memory, and one or more input and/or output (I/O) devices (or peripherals) that are communicatively coupled via a local interface. The local interface can be, for example, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the components of a network. The systems and method may be hardwired with the computer to perform various aspects of the invention.

The systems and methods may also be incorporated in software used with a computer. The software stored or loaded in the memory may include one or more separate programs, each of which comprises an ordered listing of executable instructions for implementing the methods and systems of the invention. The software may work in conjunction with an operating system. The operating system essentially controls the execution of the computer programs, such as the software stored within the memory, and provides scheduling, input-output control, file and data management, memory management, and communication control and related services.

The system and method may also include a Graphic User Interface (GUI) to allow the user to enter predetermined rules used to govern connections between the communication link and the proper destination. The GUI may provide a user-friendly interface which allows a user to select the user's current status which also may be referred to as the user's current presence. The selection of the current presence activates specific rules based on the current presence selected. For example, a user may select "working remotely" as the user's current presence. The system may direct all communication links to the user's home phone and then to the user's cell phone as a secondary location. In another example, a user may select "on a business trip". The system will then use the user's cell phone as the primary destination and then may use a manager's phone as a secondary location. The system may allow the user to select from a list of user-defined rules or allow the user to create rules custom to the user's application.

Thus, systems and methods for routing a communication link to a proper destination are provided. It will be understood that the foregoing is only illustrative of the principles of the invention and that various modifications can be made by those skilled in the art without departing from the scope and spirit of the invention. Accordingly, such embodiments will be recognized as within the scope of the present invention.

Persons skilled in the art will appreciate that the present invention can be practiced by other than the described embodiments, which are presented for purposes of illustration rather than of limitation and that the present invention is limited only by the claims that follow.

What is claimed is:

1. A method for routing communication links in a communications system to a respective correct destination comprising said communications system:
    connecting a communication link to a communications device at a first destination;
    requesting a response from the communications device indicating whether the first destination is correct, said communications system requesting said response responsive to connection to said communications device;
    validating the response from the communications device, validation indicating connection to the correct destination; and
    otherwise disconnecting the communication link to the communications device if the response fails to validate.

2. The method of claim 1, wherein if the response from the first destination is not valid, the method further comprises said communications system:
    connecting the communication link to another communications device at a second destination;
    requesting a response from the other communications device, validation indicating connection to the correct destination; and
    otherwise disconnecting the communication link to the other communications device if the response from the other communications device fails to validate.

3. The method of claim 1, wherein one or more communication links are established to communications devices associated with respective members of a telephone conference call responsive to receiving validation responses in the validating step, at least one member is associated with a plurality of communications devices including a telephone, cell phone, desktop computer, and Personal Data Assistant (PDA) located at different locations, said communications device being one of said plurality of communications devices, and the method further comprises said communications systems returning to the connecting step to connect other members until all conference call members are determined available or unavailable for said conference call.

4. The method of claim 3, wherein each correct destination is at a conference call member's location and if the response from the communications device at the first destination fails to validate, after disconnecting the method further comprises said communications system:
    notifying linked conference call members of the unavailability of a respective conference call member at the first destination and returning to the connecting step to connect with other members until all conference call members are determined available or unavailable for said conference call.

5. The method of claim 1, wherein during said validating step, said communications system determines whether a member is active at said first destination and whether said communication link is to an active member.

6. The method of claim 1, wherein the method provides a communications link on a telephone network, said communications system being included in said telephone network.

7. The method of claim 1, wherein said communications device is a caller's telephone and the response is verbal audio.

8. The method of claim 7, wherein said communications system validates using a voice recognition protocol.

9. The method of claim 1, wherein said communications device is a phone and the response is a touch-tone signal from said phone.

10. The method of claim 1, wherein requesting a response further comprises said communications system transmitting an audio segment requesting the response.

* * * * *